United States Patent [19]

Stoyan

[11] Patent Number: 4,829,137

[45] Date of Patent: May 9, 1989

[54] CONTINUOUS-WEAR HIGHLY OXYGEN PERMEABLE CONTACT LENSES

[75] Inventor: Nick Stoyan, Encino, Calif.

[73] Assignee: Bausch & Lomb Incorporated, Rochester, N.Y.

[21] Appl. No.: 916,493

[22] PCT Filed: Jan. 28, 1986

[86] PCT No.: PCT/US86/00198

§ 371 Date: Sep. 25, 1986

§ 102(e) Date: Sep. 25, 1986

[87] PCT Pub. No.: WO86/04341

PCT Pub. Date: Jul. 31, 1986

Related U.S. Application Data

[63] Continuation-in-part of Ser. No. 696,014, Jan. 29, 1985, abandoned, and a continuation-in-part of Ser. No. 722,121, Apr. 10, 1985, abandoned, and a continuation-in-part of Ser. No. 734,898, May 16, 1985, abandoned.

[51] Int. Cl.$^4$ .................... C08F 214/18; G03B 21/46

[52] U.S. Cl. .................... 526/245; 526/246; 526/279; 523/107

[58] Field of Search ............ 526/245, 246, 279; 523/107

[56] References Cited

U.S. PATENT DOCUMENTS

| | | | |
|---|---|---|---|
| 4,390,676 | 6/1983 | Loshaek | 526/313 |
| 4,419,505 | 12/1983 | Ratkowski et al. | 526/279 |
| 4,433,125 | 2/1984 | Ichinolte et al. | 526/279 |
| 4,535,138 | 8/1985 | Ratkowski et al. | 526/279 |
| 4,540,761 | 9/1985 | Kawamura | 526/245 |

*Primary Examiner*—Paul R. Michl
*Assistant Examiner*—Patrick A. Doody
*Attorney, Agent, or Firm*—Christie, Parker & Hale

[57] ABSTRACT

There are provided continuous-wear lenses formed by polymerizing a hexafluoroisopropyl ester of an unsaturated carboxylic acid which can have an oygen permeability in excess of at least $150 \times 10^{-11}$ (cm$^2$/sec.) (ml O$_2$/ml$\times$mm Hg). A UV-absorbing agent is optionally present.

36 Claims, No Drawings

CONTINUOUS-WEAR HIGHLY OXYGEN PERMEABLE CONTACT LENSES

CROSS REFERENCE TO RELATED APPLICATIONS

This is a continuation in part of U.S. application Ser. No. 696,014 filed Jan. 29, 1985, now abandoned; and a continuation-in-part of U.S. application Ser. No. 722,121 filed Apr. 10, 1985, now abandoned; and a continuation-in-part of U.S. application Ser. No. 734,898 filed May 16, 1985, now abandoned, the priority dates of which are claimed.

BACKGROUND OF THE INVENTION

The present invention is directed to eye-compatible lenses, particularly hard contact lenses having excellent oxygen permeability and wettability.

Contact lenses presently on the market are classified into two large groups: soft contact lenses and hard contact lenses. Hard contact lenses are better able than soft contact lenses to retain visual characteristics, but are less comfortable. The art has sought to increase oxygen permeability of hard contact lenses, to extend the length of time they can be worn without causing corneal damage or discomfort.

One proposed solution has been the formation of a copolymer of methyl methacrylate and a siloxane methacrylate compound. This solution has been less than satisfactory, since the lenses offered are not as hard, rigid, nor wettable as lenses formed from polymethyl methacrylate. In addition, such lenses are fragile and have poor mechanical processability.

The object of the present invention is to overcome the deficiencies in the state of the art by offering lenses having a high degree of oxygen permeability, excellent wettability, and, if desired, ultraviolet absorption. The primary benefit of UV absorptivity is the resistance to user development of cataracts.

SUMMARY OF THE INVENTION

The present invention is directed to eye-compatible, continuously-wearable, oxygen-permeable optical lenses of excellent wettability, formed of copolymers of at least one organosilicon monomer with at least one hexafluoroisopropyl ester of an unsaturated carboxylic acid containing from 2 to about 10 carbon atoms and 1 or 2 carboxyl groups, at least one hydrophilic monomer, and at least one crosslinking monomer. The preferred hexafluoroisopropyl ester of an unsaturated carboxylic acid is hexafluoroisopropylmethacrylate. The organosilicon monomer is preferably a monomer system comprising an organosilane or an organosiloxane of the general formula:

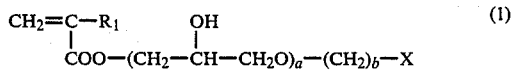

wherein $R_1$ is hydrogen or methyl, a is 0 or 1, b is from 1 to about 4, and X is an organosilicon moiety containing up to about 16 silicon atoms. It is preferred that at least a portion, and as much as 100 percent, of the organosilicon monomer system is a hydroxyorganosilicon monomer which is a monomer having at least one hydroxyl group bonded to silicon. Preferably from 0.1 to about 10 percent by weight of the monomers is a hydroxyorganosilicon monomer. The presently preferred monomers are tris(trimethylsiloxy)-γ-methacryloxypropylsilane, hydroxy-di(trimethylsiloxy)silylpropylmethacrylate, and 1,3,-bis(-methacryloxypropyl)-1,1,3,3-tetra(-trimethylsiloxy)disiloxane, particularly mixtures thereof.

A second component is a fluoroorgano monomer system comprising at least one hexafluoroisopropyl ester of an unsaturated carboxylic acid containing from 1 to about 10 carbon atoms and 1 or 2 carboxyl groups. These monomers, as against monomers of close structure, such as hexafluorobutylmethacrylate, have been surprisingly and unexpectedly found to enable the formation of lenses of extremely high oxygen permeability. The use of hexafluoroisopropylmethacrylate, for instance, enables achievement of an oxygen permeability in excess of Dk 150, and even in excess of 300. Lenses formed can be worn continuously.

A final component is a crosslinking monomer which is a crosslinking agent, preferably an organosilicon monomer, present in an amount up to about 5, preferably up to about 2, percent by weight based on the total weight of the monomers.

At least one hydrophilic monomer is included, preferably an unsaturated carboxylic acid capable of inducing wettability, and is present in an amount sufficient to provide in the resultant polymer a receding contact angle of about 45° or less. Methacrylic acid is preferred.

A UV-absorbing agent, if desired, may be included. In this instance, the agent may be a copolymerizable UV-absorbing monomer, preferably a hydroxybenzophenone or a benzotriazole compound of the formula:

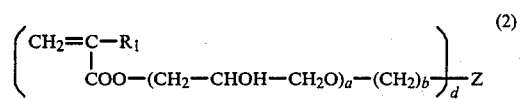

wherein $R_1$, a and b are as defined above, d is 1 or 2, and Z is:

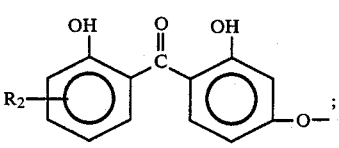

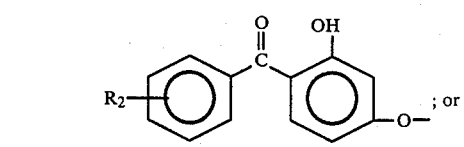

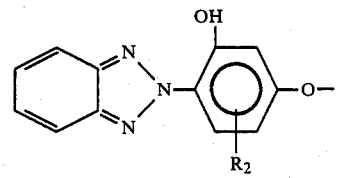

wherein $R_2$ is hydrogen, alkyl or hydroxy. Alternately or in addition, the UV-absorbing monomer may be a benzotriazole of the formula:

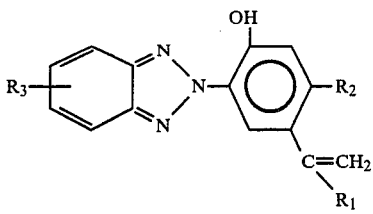

wherein $R_1$ and $R_2$ are as defined above, and $R_3$ is H or alkyl, preferably a $C_1$-$C_{10}$ alkyl. Alternately, UV-absorbing agents may be non-reactive homopolymers and copolymers comprising a UV-absorbing monomer which may be added to the monomer system and physically entrained in the polymerized mass to achieve UV protection.

It has been found that the total organosiliconmonomer content of the polymer may range from about 10 to about 40 percent by weight, preferably from about 15 to about 35 percent by weight, preferably from about 15 to about 25 percent by weight, based on the total weight of the monomers. The hydrophilic monomer may be present in an amount of from about 1 to about 15 percent by weight, preferably from about 2 to about 10 percent by weight based on the total weight of the monomers. The cross-linking monomer may be present in an amount up to about 2 percent by weight based on the total weight of the monomers. The balance of the monomer system may be solely the fluoroorgano monomers. Monomers which may be advantageously added in adjusting physical properties of the lens include monomers such as acrylates, methacrylates, itaconic esters, styrenes, fluorinated styrenes, alkyl styrenes, fluorinated alkyl styrenes, and the like, generally provided in an amount up to about 50 percent by weight of the total organofluoro content of the polymer, typically up to about 5 percent by weight of the monomers. The UV-absorbing agent, if present, may be present in an amount of from about 0.1 to about 20 percent, preferably from about 2 to about 10 percent by weight based on the total weight of the agent and monomers. For a hard lens, it is desired that the lens have a Shore D hardness greater than about 78, preferably from about 80 to about 85. This may require inclusion of modifying monomers in a concentration of up to about 50 percent by weight of the concentration of the fluoroorgano monomer, typically up to about 5 percent by weight based on the total weight of the monomers.

It is desired to provide an oxygen permeability (Dk) measured at 35° C. greater than about $150 \times 10^{-11}$(cm$^2$/sec.) (ml O$_2$/ml$\times$mm Hg). This is achieved by inclusion of a sufficient amount of the hexafluoroisopropyl ester of an unsaturated carboxylic acid.

DETAILED DESCRIPTION

The present invention is directed to eye-compatible, e.g., corneal-compatible, continuous-wear lenses, in particular, hard contact lenses formed of an interpolymerized amount of an organosilicon monomer system, preferably one containing at least one hydroxyorganosilicon monomer, at least one hexafluoroisopropyl ester of an unsaturated carboxylic acid containing from about 2 to about 10 carbon atoms and 1 or 2 carboxyl groups, at least one monomeric unsaturated carboxylic acid hydrophilic monomer, and at least one crosslinking monomer. If desired, a UV-absorbing agent which is preferably a benzotriazole and/or a benzophenone monomer or non-leachable polymer comprising one or more such monomers, may be incorporated in the system. Other reactive monomers such as acrylates, methacrylates, itaconic esters, styrenes, alkyl styrenes, and the like, may be included as part of the polymerizable composition, to achieve a lens of desired properties, such as hardness for machinability, wettability, and oxygen-permeability.

The hexafluoroisopropyl esters of an unsaturated carboxylic acid containing from 2 to about 10 carbon atoms and 1 or 2 carboxyl groups, include reactive monomers of the structure:

wherein M is hydrogen, alkyl or fluoroalkyl, and $M_1$ is hydrogen, alkyl, fluoroalkyl, alkyl carboxy, carboxyester, alkyl carboxyester, fluorinated carboxyester, fluorinated alkyl carboxyester, cyano, or phenyl, with the proviso that the structure contain at least one hexafluoroisopropyl ester group. Hexafluoroisopropylmethacrylate is presently preferred.

By the term "organosilicon monomer" as used herein, there is meant unsaturated silicon monomers which are copolymerizable with hexafluoroisopropyl esters of an unsaturated carboxylic acid, to yield lenses of high oxygen permeability, and which, in the amounts employed, are non-deleterious to the lens user.

The presently preferred organosilicon monomers which may be used in accordance with the instant invention include organosilicon monomers which are organosilanes and/or organosiloxanes of the general formula:

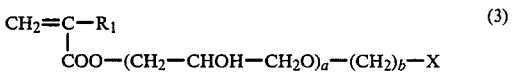

wherein $R_1$ is hydrogen or methyl, a is 0 or 1, b is from 1 to about 4, and X is an organosilicon moiety containing up to about 26 silicon atoms. Desirably, at least a portion, or all, of the organosilicon monomer system is a hydroxyorganosilicon monomer, namely, a monomer having at least one hydroxyl group bonded to silicon.

Preferred organosilicon compounds are acrylates and methacrylates of the general formula:

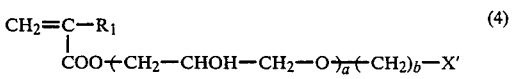

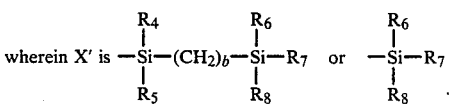

each of $R_4$ and $R_5$ is independently a $C_1$-$C_5$ alkyl, phenyl, hydroxyl, or —O—Si(CH$_3$)$_3$, and each of $R_6$, $R_7$ and $R_8$ is independently selected from $C_1$-$C_5$; —CH$_2$=CH$_2$; phenyl; hydroxyl: —CH$_2$OH;

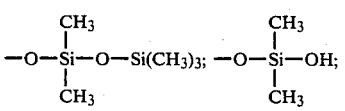

$$-O-SiCH_3 \begin{matrix} O-Si(CH_3)_3 \\ \\ O-Si(CH_3)_3 \end{matrix} \quad ; \quad O-Si-[OSi(CH_3)_3]_3; \text{ or}$$

$$\begin{matrix} CH_2=C-R_1 \\ | \\ COO-(CH_2-CHOH-CH_2-O)_{\overline{a}}(CH_2)_b-, \end{matrix}$$

wherein $R_1$, a, and b are as defined above.

The monomers included are: tris(trimethylsiloxy)-silylpropylmethacrylate, 1,3-bis-(-γ-methacryloxy-propyl)-1,1,3,3-tetra(trimethylsiloxy)disiloxane, vinyl di(trimethylsiloxy)silylpropylmethacrylate, pentamethyldisiloxy)-γ-methacryloxypropylsilane, trimethylsilylpropylmethacrylate, methyl di(trimethylsiloxy)-silylpropylmethacrylate, tris(trimethylsiloxy)silyl-propylglycerolmethacrylate, and the like. Tris(trimethylsiloxy)-methacryloxypropylsilane is presently preferred. Another important monomer is 1,3-bis-(γ-methacryloxypropyl)-1,1,3,3-tetra(trimethylsiloxy)-disiloxane, as it serves as a crosslinking agent without sacrificing oxygen permeability. When used for this purpose, concentration may vary from about 0.1 to about 2 percent by weight based on the total weight of the reactants.

Representative hydroxyorganosilicon monomers include hydroxy-di(trimethylsiloxy)silylpropylmethacrylate, hydroxy-di(trimethylsiloxy)-γ-methacryloxy-propylsilane, hydroxy-methyl(trimethylsiloxy)methacryloxymethylsilane, hydroxy-methyl(trimethylsiloxy)-methacryloxyethylsilane, hydroxy-methyl(trimethylsiloxy)methacryloxypropylsilane, hydroxy-di(trimethylsiloxy)-γ-methacryloxyethylsilane, hydroxy-di(-trimethylsiloxy)-methacryloxy methylsilane, hydroxy-(trimethylsiloxy)-(pentamethyldisiloxy)-methacryloxy-methylsilane, hydroxy-(trimethylsiloxy)(pentamethyl-disiloxy)-γ-methacryloxyethylsilane, and the like. Hydroxy-di(trimethylsiloxy)silylpropylmethacrylate is presently preferred.

Other useful organosilicon monomers are disclosed in U.S. Pat. Nos. 4,152,508 to Ellis; 4,153,641 to Deichert et al; 4,189,546 to Deichert et al; and 4,463,149 to Ellis, each incorporated herein by reference.

While total concentrations of organosilicon monomers may range from about 10 to about 40 percent by weight based on the total weight of the monomers, the preferred range is from about 15 to about 35 percent by weight, more preferably from about 15 to about 25 percent by weight.

Oxygen-permeability (all other factors being stant) will increase with an increase in organosilicon monomer content. At higher levels, the lens becomes more difficult to machine. Inclusion of monomers such as acrylates, methacrylates, itaconic esters, styrenes, alkyl styrenes and the like, may be employed as part of the monomer system to yield a lens having a desirable machinability, oxygen permeability, wettability, and the like. Lenses having a Shore D hardness greater than about 78, preferably from about 80 to about 85, are desired for hard, machinable lenses.

While hexafluoroisopropylmethacrylate is essential to high oxygen permeability, oxygen permeability and wettability of the lens may be enhanced by the presence of a hydroxyorganosilicon monomer. Although the presently preferred concentration of the hydroxyorganosilicon monomer is from about 0.1 to about 10 percent by weight of the total monomers, it may be the exclusive organosilicon monomer, except for any multifunctional organosilicon monomer used as a crosslinking monomer.

Critical to high oxygen permeability is the inclusion in the monomer system of hexafluoroisopropyl ester of an unsaturated carboxylic acid, which enables the achievement of an oxygen permeability (Dk) in excess of about 150. This renders the lens continuously wearable, i.e., wearable twenty-four hours a day for indefinite periods of time.

Other fluoroorgano monomers may be used as diluent monomers, at some sacrifice of oxygen permeability. They include compounds of the formula:

$$\begin{matrix} CH_2=C-R_1 \\ | \\ COO(M_2)_a-(CH_2)_c-Y \end{matrix} \quad (4)$$

wherein $R_1$ and a are as defined above, $M_2$ is hydroxy alkyl, alkyl ether, or hydroxy alkyl ether, c is from 0 to 4, and Y is a fluorocarbon group. Preferably, Y has the general formula:

$$C_nF_{2n+1}$$

or $$C_nF_{2n}H.$$

Illustrative of fluoroorgano monomers are 2,2,2-trifluoroethylmethacrylate, hexafluorobutylmethacrylate, pentafluoro-n-propylmethacrylate, and the like, with 2,2,2-trifluoroethylmethacrylate being preferred for cost. Perfluoro or fluorinated styrenes may also be used.

Hydrophilic monomers are included in the composition to induce wettability. They preferably comprise an unsaturated carboxylic acid, most preferably methacrylic acid, for compatability of monomers and wearer comfort. Acrylic acid is functional but less desirable. Other monomers such as 2-hydroxyethylmethacrylate, vinyl pyrrolidone, and the like may be used. Concentration may be from about 0.1 to about 15 or more percent by weight, preferably from about 2 to about 10 percent by weight based on the total weight of the monomers.

The amount of hydrophilic monomer present depends on whether a UV-absorbing agent, as described below, is employed, as the latter also has the capability of adding hydrophilic properties. If a UV-absorbing agent is employed, its concentration may range from about 0.1 to about 20 percent by weight, preferably from about 2 to about 10 percent by weight based on the total weight of the monomers and agent. The UV absorbing agents used herein cooperate with the hydrophilic monomer to induce wettability and anisepticability, i.e., self-sterilizable, in consequence of hydroxy-substituted benzene moieties. The UV absorbers absorb in the polymerized state in the range of from about 300 nm to about 450 nm, preferably with no less than about 70% UV radiation at 370 nm. The UV-absorbing agent may be monomers that are interpolymerized with the monomers of the composition to become part of the formed copolymer, or they may be separately homopolymerized or copolymerized to nonreactive polymers of sufficient molecular weight so as to be physically entrained in the copolymer body formed by polymerizing the lens-forming monomers. The presently preferred monomers are those of the formula:

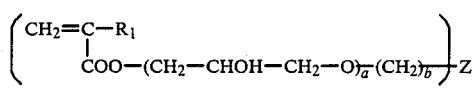

wherein $R_1$ is hydrogen or methyl, a is 0 or 1, b is from about 1 to about 4, d is 1 or 2, and Z is:

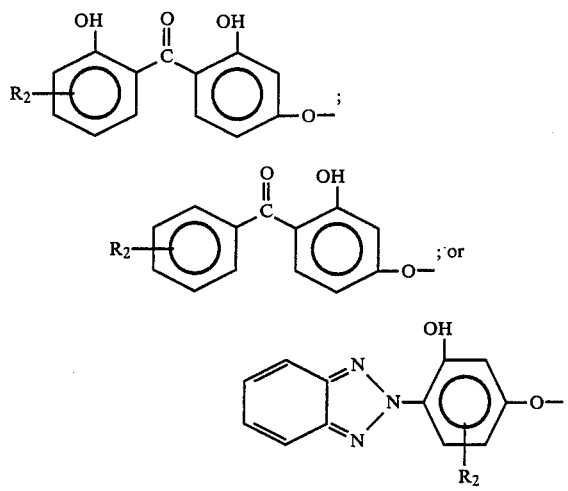

wherein $R_2$ is hydrogen; an alkyl, preferably a $C_1$–$C_5$ alkyl or hydroxyl; and c is 1 or 2. In the alternative or in addition, there may be employed a phenyl benzotriazole of the formula:

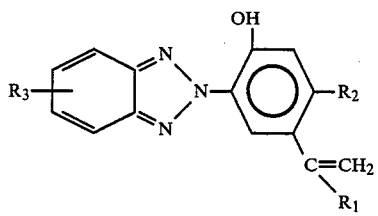

Preferred UV-absorbing monomers for forming UV-absorbing agents include: 2-hydroxy-4-(2-methacryloyloxyethoxy)benzophenone, 2-hydroxy-4-(2-acryloyloxyethoxy)benzophenone, 2-hydroxy-4-(2-hydroxy-3-methacryloxypropyl)benzophenone, 2-(2-hydroxy-5-vinylphenyl)-2H-benzotriazole, and the like.

The lenses of the instant invention are formulated to a have high oxygen permeability (Dk) of at least about 150, preferably greater than about 200 [expressed in units of $10^{-11}$ (cm$^2$/sec.)(ml O$_2$/ml $\times$ mm Hg), as determined at 35° C.], as induced by the presence of a sufficient amount of a hexafluoroisopropyl ester of an unsaturated carboxylic acid. High oxygen permeability is surprisingly and unexpectedly attributed to the hexafluoroisopropyl moiety. With compositions of high organosilicon-monomer content there are displayed increased brittleness and a reduction in capability to undergo machining. At least one cross-linking agent, such as a multi-functional organosilicon monomer, a fluoroorgano monomer, an acrylate and/or a methacrylate, is employed in an amount sufficient to control hardness of the lens, which for hard lenses is in the range of Shore D hardness of greater than about 78, preferably from about 80 to about 85. A highly multifunctional organosilicon monomer is preferred, as it does not interfere with oxygen permeability. Other cross-linking agents which may be used include ethylene glycol dimethacrylate, ethylene glycol diacrylate, diethylene glycol dimethacrylate, diethylene glycol diacrylate, and the like.

Lens formation may be by free radical polymerization such as azobisisobutyronitrile (AIBN) and peroxide catalysts under conditions set forth in U.S. Pat. No. 3,808,179, incorporated herein by reference. Colorants and the like may be added prior to monomer polymerization. It is preferred to form the lens base in sheet form between layers of a non-adherent surface. The sheet is cut into smaller lense precursors from which the lens is ground to user specifications. Spin-casting, as described for instance in U.S. Pat. No. 3,408,429, incorporated herein by reference, may also be used.

Without limiting, the following Example is illustrative of the instant invention. With reference to the Example, properties of the contact lenses were measured according to the following methods.

Oxygen permeability values were determined using a test method developed by Dr. Irving Fatt of Berkeley, Calif., and disclosed in the paper, entitled: "Oxygen Transmissibility and Permeability of Gas Permeable Hard Contact Lenses and Materials" by Irving Fatt, Ph.D., *International Contact Lens Clinic*, Vol. 11, No. 3, March 1984. The instrument was a polarographic cell with a curved surface for finished lenses, polarographic amplifier, recorder and a constant temperature chamber equipped with a temperature control unit. The measurements were made at 35° C. and the units of oxygen permeability are (cm$^2$/sec.)(ml O$_2$/ml $\times$ mm Hg).

The water wettability of the contact lens material was determined by the sesile drop method using a Rame-Hart goniometer with an environmental chamber. Both the advancing and the receding contact angles were determined.

The hardness was measured as Shore D at 22° C. using a hardness tester, and percent light transmission was measured using a recording spectrophotometer. The amount of materials extractable from he lenses were evaluated by first storing them in a saline solution for 10 days at 35° C. The lenses were then rinsed with distilled water, dried, weighed, and placed in stoppered, 25 cc volumetric flasks, again containing saline as the extracting medium. The saline was analyzed daily for its extracted ultraviolet absorber by placing 4 cc of the extract in a spectrophotometer cell and determining the absorption at 320 nm. The absorption values were compared against the calibration curve made for the pure ultraviolet absorber. Extractables can also be determined by the Soxhlet extraction method, using water as the solvent. The amount of extractables was determined only for a few of the materials in the Examples. Based on 0.04 gr average lens weight, extractables were found to be, on the average, less than $1 \times 10^{-4}$ mc grams/lens/day, until a steady state was reached.

The leachability-diffusibility was evaluated by cytotoxicity assay-agar overlay method.

The assay is based on the method described by Guess, W. L., Rosenbluth, S. A., Schmidt, B., and Autian, J., in "Agar Diffusion Method for Toxicity Screening of Plastics on Cultured Cell Monolayers", J. Pharm. Sci. 54: 1545–1547, 1965, incorporated herein by reference, and is designed to detect he response of a mammalian monolayer cell culture to readily diffusible components from materials or test solutions applied to the surface of an agar layer overlaying the monolayer.

The response of the cell monolayer is evaluated, with respect to the discoloration of the red-stained monolayer, under and around the sample when the petri dish is viewed against a white background. Loss of color of the stained cells is considered to be a physiologically significant reaction of the cells. The extent of discoloration is confirmed by examination of the monolayer on an inverted microscope, and the extent of lysis of the cells within the discoloration zone is estimated. Typically, discoloration of cells precedes lysis, as manifested by a region and a region showing lysis. A sample is reported as "cytotoxic" only if lysis is observed.

EXAMPLE 1

There was formulated a mixture of 19 parts by weight tris(trimethylsiloxy)silylpropylmethacrylate, 0.1 parts by weight 1,3-bis($\gamma$-methacryloxypropyl)-1,1,3,3-tetra(-trimethylsiloxy)disiloxane, 0.9 parts by weight hydroxy-di(trimethylsiloxy)silylpropylmethacrylate, 75 parts by weight hexafluoroisopropylmethacrylate, 5 parts by weight methacrylic acid, and 0.2 parts by weight AIBN. The mixture was homogenized, degassed and placed in a polymerization cell made of two glass plates separated by a seal and held together by spring clamps. After filling, the cell was purged with nitrogen, sealed and placed in a circulating water bath at 60° C. for 10 hours. After the initial polymerization period, the cell was heated at 80° C. for 3 hours, 100° C. for one hour, and then allowed to cool to room temperature. The clamps were then removed and the transparent sheet heated for 2 hours at 100° C. The plastic sheet, about ¼ inch in thickness, was cut into squares, then formed to discs which were used to prepare corneal contact lenses using conventional hard-contact-lens-making equipment. The properties of this lens material are also shown in Table I.

Table I

Oxygen permeability $\times 10^{-11}$ (cm$^2$/sec.)(ml O$_2$/ml $\times$ mm Hg): 234
Contact angle, receding: 28
Shore D hardness: 79
Cytotoxicity assay: negative
Lenses of another batch give an average permeability of $164 \times 10^{-11}$ (cm$^2$/sec.)(ml O$_2$/ml $\times$ mm Hg).

EXAMPLE 2

The procedure of Example 1 was repeated, except that the formulation contained 28.5 parts by weight tris(trimethylsiloxy)silylpropylmethacrylate, 0.2 parts by weight 1,3-bis(-methacryloxypropyl)-1,1,3,3-tetra(-trimethylsiloxy)disiloxane, 1.3 parts by weight hydroxy-di(trimethylsiloxy)silylpropylmethacrylate, 65 parts by weight hexafluoroisopropylmethacrylate, and 5 parts by weight methacrylic acid. Average oxygen permeability was $398 \times 10^{-11}$ (cm$^2$/sec.)(ml O$_2$/ml $\times$ mm Hg).

Control

The procedure of Example 1 was repeated, except that hexafluorobutylmethacrylate was used instead of hexafluoroisopropylmethacrylate. The properties are shown in Table II.

Table II

Oxygen permeability $\times 10^{-11}$ (cm$^2$/sec.)(ml O$_2$/ml $\times$ mm Hg): 42
Contact angle, receding: 26
Shore D hardness: 78
Cytotoxicity assay: negative

What is claimed is:

1. A highly-oxygen-permeable continuous-wear lens formed of a polymer comprising an interpolymerized amount of:
   (a) at least one hexafluoroisopropyl ester of an unsaturated carboxylic acid containing from 2 to about 10 carbon atoms and 1 or 2 carboxyl groups;
   (b) at least one organosilicon monomer copolymerizable with a hexafluoroisopropyl ester of an unsaturated carboxylic acid present in an amount of from about 10 to about 40 percent by weight based on the total weight of the monomers;
   (c) at least one hydrophilic monomer present in an amount sufficient to provide in the resultant polymer a contact angle of less than about 45°; and
   (d) at least one crosslinking monomer, the total of crosslinking monomer being present in an amount up to about 5 percent by weight based on the total weight of the monomers.

2. A highly-oxygen permeable continuous-wear lens formed of a polymer comprising an interpolymerized amount of:
   (a) at least one hexafluoroisopropyl ester of an unsaturated carboxylic acid containing from 2 to about 10 carbon atoms and 1 of 2 carboxyl groups;
   (b) at least one organosilicon monomer system copolymerizable with a hexafluoroisopropyl ester of an unsaturated carboxylic acid present in an amount of from about 10 to about 40 percent by weight based on the total weight of the monomers; said organosilicon tronomer system comprised of at least one monomer of the formula:

$$\begin{array}{cc} CH_2=C-R_1 & OH \\ | & | \\ COO-(CH_2-CH-CH_2O)_a-(CH_2)_b-X \end{array}$$

wherein $R_1$ is hydrogen or methyl, a is 0 or 1, b is from 1 to about 4, and X is an organosilicon moiety containing up to about 16 silicon atoms;
   (c) at least one hydrophilic monomer present in an amount sufficient to provide in the resultant polymer a contact angle of less than about 45°; and
   (d) at least one crosslinking monomer, the total of crosslinking monomer being present in an amount up to about 5 percent by weight based on the total weight of the monomers.

3. A highly oxygen-permeable continuous-wear lens formed of a polymer comprising an interpolymerized amount of the following monomers:
   (a) at least one hexafluoroisopropyl ester of an unsaturated carboxylic acid containing from 2 to about 6 carbon atoms and 1 or 2 carboxyl groups;
   (b) at least one organosilicon monomer copolymerizable with a hexafluoroisopropyl ester of an unsaturated carboxylic acid present in an amount of from about 10 to about 40 percent by weight based on the total weight of the monomers;

(c) at least one hydrophilic monomer present in an amount sufficient to provide in the resultant polymer a contact angle of less than about 45°; and (d) at least one crosslinking monomer, the total of crosslinking monomer being present in an amount up to about 5 percent by weight based on the total weight of the monomers, said lens having an oxygen permeability of at least about $150 \times 10^{-11}$ $(cm^2/sec.)(ml\ O_2/ml \times mm\ Hg)$.

4. A highly oxygen-permeable continuous-wear lens as claimed in claim 3 in which the organosilicon monomer is an organosilicon monomer system comprised of at least one monomer of the formula:

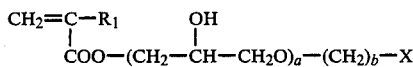

wherein $R_1$ is hydrogen or methyl, a is 0 or 1, b is from 1 to about 4, and X is an organosilicon moiety containing up to about 16 silicon atoms.

5. A highly oxygen-permeable continuous-wear lens as claimed in claim 4 in which at least a portion of the organosilicon monomer system is a hydroxyorganosilicon monomer having at least one hydroxyl group attached to silicon of the organosilicon moiety.

6. A highly oxygen-permeable continuous-wear lens as claimed in claim 3 in which there is present, in addition to hexafluoroisopropylmethacrylate, at least one other fluoroorgano monomer of the formula:

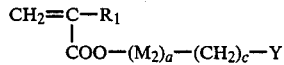

wherein $R_1$ is hydrogen or methyl, $M_2$ is hydroxy alkyl, alkyl ether, or hydroxy alkyl ether, a is 0 or 1, c is from 0 to 4, and Y is a fluorocarbon group preferably containing from about 2 to about 21 fluorine atoms.

7. A highly oxygen-permeable continuous-wear lens as claimed in claim 4 in which there is present, in addition to hexafluoroisopropylmethacrylate, at least one other fluoroorgano monomer of the formula:

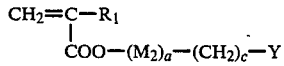

wherein $R_1$ is hydrogen or methyl, $M_2$ is hydroxy alkyl, alkyl ether or hydroxy alkyl ether, a is 0 or 1, c is from 0 to 4, and Y is a fluorocarbon group preferably containing from about 2 to about 21 fluorine atoms.

8. A highly oxygen-permeable continuous-wear lens as claimed in claim 5 in which there is present at least one other fluoroorgano monomer of the formula:

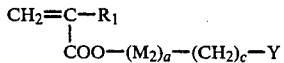

wherein $R_1$ is hydrogen or methyl, $M_2$ is hydroxy alkyl, alkyl ether, or hydroxy alkyl ether, a is 0 or 1, c is from 0 to 4, and Y is a fluorocarbon group preferably containing from about 2 to about 21 fluorine atoms.

9. A highly oxygen-permeable continuous-wear lens as claimed in claim 3 in which there is present at least one UV-absorbing agent present in an amount of from about 0.1 to about 20 percent by weight based on the weight of UV-absorbing agent and the monomers.

10. A highly oxygen-permeable continuous-wear lens as claimed in claim 9 in which the UV-absorbing agent comprises a polymerized amount of a monomer selected from the group consisting of a hydroxybenzophenone or benzotriazole of the formula:

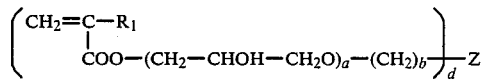

wherein $R_1$ is hydrogen or methyl, a is 0 or 1, b is from 1 to about 4, d is 1 or 2, and Z is:

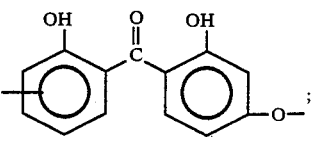

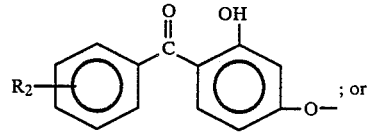

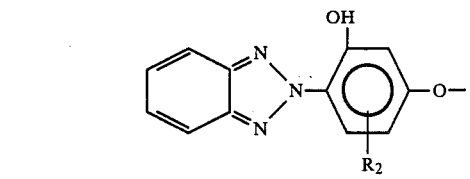

wherein $R_2$ is hydrogen, alkyl or hydroxy and a phenyl benzotriazole of the formula:

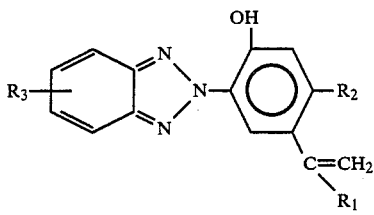

wherein $R_1$ and $R_2$ are as defined above, and $R_3$ is H; alkyl, preferably a $C_1$–$C_{10}$ alkyl, or hydroxyl.

11. A highly oxygen-permeable continuous-wear lens as claimed in claim 3 in which the organosilicon monomer is present in a concentration of from about 20 to about 30 percent by weight based on the total weight of interpolymerized monomers.

12. A highly oxygen-permeable continuous-wear lens as claimed in claim 3 in which the organosilicon monomer is present in a concentration of from about 15 to about 25 percent by weight based on the total weight of interpolymerized monomers.

13. A highly oxygen-permeable continuous-wear lens as claimed in claim 5 in which the hydroxyorganosilicon monomer is present in an amount of from about 0.1 to about 10 percent by weight of the total weight of the interpolymerized monomers.

14. A highly oxygen-permeable continuous-wear lens formed of a polymer comprising an interpolymerized amount of:

(a) hexafluoroisopropylmethacrylate;
(b) at least one organosilicon monomer copolymerizable with hexafluoroisopropylmethacrylate and present in an amount of from about 10 to about 40 percent by weight based on the total weight of the monomers;
(c) at least one hydrophilic monomer present in an amount sufficient to provide in the resultant polymer a contact angle of less than about 45°; and
(d) at least one crosslinking monomer, the total of crosslinking monomer being present in an amount up to about 5 percent by weight based on the total weight of the monomers, said lens having an oxygen permeability of at least about $150 \times 10^{-11}$ (cm$^2$/sec.)(ml O$_2$/ml × mm Hg).

15. A highly oxygen-permeable continuous-wear lens as claimed in claim 14 in which the organosilicon monomer is an organosilicon monomer system comprised of at least one monomer of the formula:

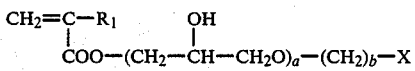

wherein R$_1$ is hydrogen or methyl, a is 0 or 1, b is from 1 to about 4, and X is an organosilicon moiety containing up to about 16 silicon atoms.

16. A highly oxygen-permeable continuous-wear lens as claimed in claim 15 in which at least a portion of the organosilicon monomer system is a hydroxyorganosilicon monomer having at least one hydroxyl group attached to silicon of the organosilicon moiety.

17. A highly oxygen-permeable continuous-wear lens as claimed in claim 15 in which there is present, in addition to hexafluoroisopropylmethacrylate, at least one other fluoroorgano monomer of the formula:

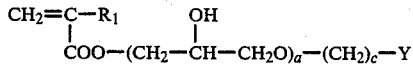

wherein R$_1$ is hydrogen or methyl, a is 0 or 1, c is from 0 to 4, and Y is a fluorocarbon group preferably containing from about 2 to about 21 fluorine atoms.

18. A highly oxygen-permeable continuous-wear lens as claimed in claim 16 in which there is present, in addition to hexafluoroisopropylmethacrylate, at least one other fluoroorgano monomer of the formula:

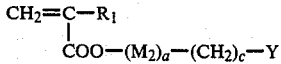

wherein R$_1$ is hydrogen or alkyl, M$_2$ is hydroxy alkyl, alkyl ether, or hydroxy alkyl ether, a is 0 or 1, c is from 0 to 4, and Y is a fluorocarbon group preferably containing from about 2 to about 21 fluorine atoms.

19. A highly oxygen-permeable continuous-wear lens as claimed in claim 6 in which there is present at least one other fluoroorgano monomer of the formula:

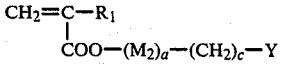

wherein R$_1$ is hydrogen or alkyl, M$_2$ is hydroxy alkyl, alkyl ether, or hydroxy alkyl ether, a is 0 or 1, c is from 0 to 4, and Y is a fluorocarbon group preferably containing from about 2 to about 21 fluorine atoms.

20. A highly oxygen-permeable continuous-wear lens as claimed in claim 15 in which there is present at least one UV-absorbing agent present in an amount of from about 0.1 to about 20 percent by weight based on the weight of UV-absorbing agent and the monomers.

21. A highly oxygen-permeable continuous-wear lens as claimed in claim 20 in which the UV-absorbing agent comprises a polymerized amount of a monomer selected from the group consisting of a hydroxybenzophenone or benzotriazole of the formula:

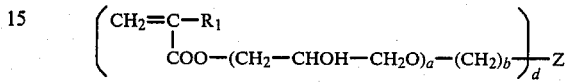

wherein R$_1$ is hydrogen or methyl, a is 0 or 1, b is from 1 to about 4, d is 1 or 2, and Z is:

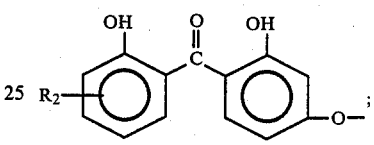

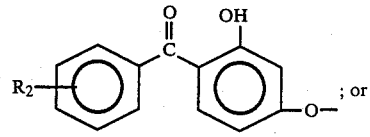

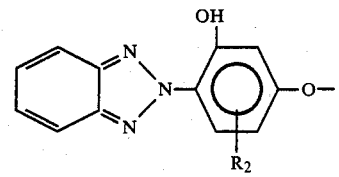

wherein R$_2$ is hydrogen, alkyl or hydroxy and a phenyl benzotriazole of the formula:

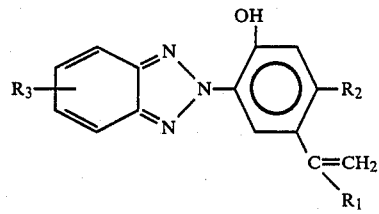

wherein R$_1$ and R$_2$ are as defined above, and R$_3$ is H; alkyl, preferably a C$_1$-C$_{10}$ alkyl, or hydroxyl.

22. A highly oxygen-permeable continuous-wear lens as claimed in claim 15 in which the organosilicon monomer is present in a concentration of from about 20 to about 30 percent by weight based on the total weight of interpolymerized monomers.

23. A highly oxygen-permeable continuous-wear lens as claimed in claim 15 in which the organosilicon monomer is present in a concentration of from about 15 to about 25 percent by weight based on the total weight of interpolymerized monomers.

24. A highly oxygen-permeable continuous-wear lens as claimed in claim 17 in which the hydroxyorganosilicon monomer is present in an amount of from about 0.1 to about 10 percent by weight of the total weight of the interpolymerized monomers.

25. A highly oxygen-permeable continuous-wear lens as claimed in claim 15 in which the organosilicon monomer is selected from tris(trimethylsiloxy)-γ-methacryloxypropylsilane, 1,3-bis-(γ-methacryloxypropyl)1,1,3,3-tetra(trimethylsiloxy)disiloxane and mixtures thereof.

26. A highly oxygen-permeable continuous-wear lens as claimed in claim 17 in which the organosilicon monomer is selected from tris(trimethylsiloxy)-γ-methacryloxypropylsilane, 1,3-bis-(γ-methacryloxypropyl)1,1,3,3-tetra(trimethylsiloxy)disiloxane and mixtures thereof, and in which the hydroxyorganosilicon monomer is hydroxy-di-(trimethylsiloxy)silylpropylmethacrylate.

27. A highly oxygen-permeable continuous-wear lens which comprises a polymer containing:
(a) from about 15 to about 25 percent by weight, based on the total weight of monomers forming the polymer, of an organosilicon monomer system comprising tris(trimethylsiloxy)silylpropylmethacrylate;
(b) methacrylic acid in an amount sufficient to provide to the resultant polymer a contact angle of less than about 45°; and
(c) at least one crosslinking monomer, the total of crosslinking monomers being present in a concentration of from about 0.1 to about 2 percent by weight based on the total weight of the monomers, the balance of the monomers comprising hexafluoroisopropylmethacrylate.

28. A highly oxygen-permeable continuous-wear lens comprising a polymer containing on an interpolymerized basis, from about 19 to about 30 parts by weight tris(trimethylsiloxy)silylpropylmethacrylate, from about 0.1 to about 0.2 parts by weight 1,3,-bis(γ-methacryloxypropyl)-1,1,3,3-tetra(-trimethylsiloxy)disiloxane, from about 65 to about 75 parts by weight hexafluoroisopropylmethacrylate, and about 5 parts by weight methacrylic acid.

29. A highly oxygen-permeable lens as claimed in claim 1 in which the lens has an oxygen permeability of at least about $150 \times 10^{-11}$ (cm$^2$/sec.) (ml O$_2$/ml$\times$mm Hg).

30. A highly oxygen-permeable lens as claimed in claim 2 in which the lens has an oxygen permeability of at least about $150 \times 10^{-11}$ (cm$^2$/sec.) (ml O$_2$/ml$\times$mm Hg).

31. A highly oxygen-permeable lens as claimed in claim 27 in which the lens has an oxygen permeability of at least about $150 \times 10^{-11}$ (cm$^2$/sec.) (ml O$_2$/ml$\times$mm Hg).

32. A highly oxygen-permeable continuous-wear lens as claimed in claim 1 in which the organosilicon monomer is an organosilicon monomer system comprised of at least one monomer of the formula:

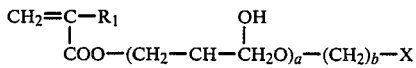

wherein R$_1$ is hydrogen or methyl, a is 0 or 1, b is from 1 to about 4, and X is an organosilicon moiety containing up to about 16 silicon atoms.

33. A highly oxygen-permeable continuous-wear lens as claimed in claim 30 in which there is present, in addition to the hexafluoroisopropyl ester of an unsaturated carboxylic acid, at least one other fluoroorgano monomer of the formula:

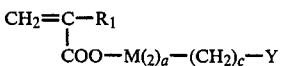

wherein R$_1$ is hydrogen or methyl, M$_2$ is hydroxy alkyl, alkyl ether, or hydroxy alkyl ether, a is 0 or 1, c is from 0 to 4, and Y is a fluorocarbon group preferably containing from about 2 to about 21 fluorine atoms.

34. A highly oxygen-permeable continuous-wear lens as claimed in claim 2 in which there is present, in addition to the hexafluoroisopropyl ester of an unsaturated carboxylic acid, at least one other fluororgano monomer of the formula:

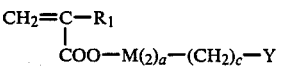

wherein R$_1$ is hydrogen or methyl, M$_2$ is hydroxy alkyl, alkyl ether, or hydroxy alkyl ether, a is 0 or 1, c is from 0 to 4, and Y is a fluorocarbon group preferably containing from about 2 to about 21 fluorine atoms.

35. A highly oxygen-permeable continuous-wear lens as claimed in claim 1 in which the organosilicon monomer is selected from tris(trimethylsiloxy)-γ-methacryloxy-propysilane, 1,3-bis-(γ-methacryloxypropyl)1,1,3,3-tetra(trimethylsiloxy)-disiloxane and mixtures thereof and in which the hydroxyorganosilicon monomer is hydroxi-di-(trimethylsiloxy)silylpropylmethacrylate.

36. A highly oxygen-permeable continuous-wear lens as claimed in claim 2 in which the organosilicon monomer is selected from tris(trimethylsiloxy)-γ-methacryloxy-propysilane, 1,3-bis-(γ-methacryloxypropyl)1,1,3,3-tetra(trimethylsiloxy)disiloxane and mixtures thereof and in which the hydroxyorganosilicon monomer is hydroxidi(trimethylsiloxy)silylpropylmethacrylate.

* * * * *

UNITED STATES PATENT AND TRADEMARK OFFICE
CERTIFICATE OF CORRECTION

PATENT NO. : 4,829,137

DATED : May 9, 1989

INVENTOR(S) : Nick Stoyan

It is certified that error appears in the above-identified patent and that said Letters Patent is hereby corrected as shown below:

In the Specification:

Column 5, line 50, change "stant" to -- constant --.

Column 6, lines 54,55, change "anisepticability" to -- antisepticability --.

Column 8, line 42, change "he" to -- the --.
Column 8, line 67, change "he" to -- the --.

In the Claims

Column 16, line 45, change "hydroxi" to -- hydroxy --.
Column 16, line 53, change "hydroxidi" to -- hydroxy-di- --.

Signed and Sealed this

Fifth Day of June, 1990

Attest:

HARRY F. MANBECK, JR.

*Attesting Officer*       *Commissioner of Patents and Trademarks*